United States Patent

Kasprzak et al.

[11] Patent Number: 5,300,667
[45] Date of Patent: Apr. 5, 1994

[54] WATER DISPERSIBLE SILICONE COMPOSITION

[75] Inventors: Kenneth A. Kasprzak, Saginaw; Linda M. Madore, Midland, both of Mich.

[73] Assignee: Dow Corning Corporation, Midland, Mich.

[21] Appl. No.: 926,620

[22] Filed: Aug. 10, 1992

[51] Int. Cl.$^5$ .......................... A61K 9/10; C07F 7/04; C07F 7/08
[52] U.S. Cl. .................................... 556/437
[58] Field of Search .......................... 556/437

[56] References Cited

U.S. PATENT DOCUMENTS

| | | | |
|---|---|---|---|
| 3,402,192 | 9/1968 | Hafuska | 556/437 |
| 4,658,049 | 4/1987 | Nakano et al. | 556/437 |
| 4,846,982 | 7/1989 | Madore et al. | 252/8.75 |
| 4,853,474 | 8/1989 | Bahr et al. | 556/437 |
| 4,874,868 | 10/1989 | Bolich, Jr. | 556/437 |
| 5,093,511 | 3/1992 | Yoshida et al. | 556/437 |
| 5,159,096 | 10/1992 | Austin et al. | 556/437 |

*Primary Examiner*—Dale R. Ore
*Attorney, Agent, or Firm*—James L. DeCesare

[57] ABSTRACT

A composition consisting of a mixture of a silicone polymer having the formula

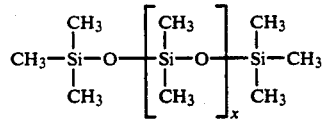

having a viscosity of 350–30,000 centistokes, and a polyoxyalkylene siloxane copolymer having a viscosity of fifteen hundred centistokes at 25° C.

3 Claims, No Drawings

WATER DISPERSIBLE SILICONE COMPOSITION

BACKGROUND OF THE INVENTION

This invention relates to a composition which is a mixture of a silicone polymer and a silicon polymer which is useful as a cosmetic raw material because of its water dispersibility.

The use of silicones as cosmetic raw materials is well documented as are their benefits. One hindrance to the use of silicones in person care products for application to the skin and hair is their limited solubility in water and other polar media frequently encountered in the cosmetic market. One solution has been to incorporate silicones by means of sometimes complex emulsion techniques which often require expensive equipment and high shear. Thus, a need exists for water dispersible silicones and silicones which have increased water solubility and water compatibility.

In U.S. Pat. No. 4,846,982 issued Jul. 11, 1989, there is disclosed a three component system including a silicone polymer, a silicone copolymer, and a quaternary ammonium compound, which is taught to be useful as a conditioner in fabric care applications.

In accordance with the present invention, it has been unexpectedly discovered that when only the silicon polymer and the silicon copolymer are combined together, that the two components form homogeneous mixtures which can be further diluted with water to form shelf stable products without emulsification. This benefit increases the value of the silicones as cosmetic raw materials.

SUMMARY OF THE INVENTION

It is an object of the present invention to provide a silicone material which can be incorporated into an aqueous system without using sophisticated high shear equipment.

It is also an object of the present invention to provide a silicon material which is water dispersible, and which when combined with water forms a water solution which is shelf stable.

These and other features, objects, and advantages of the present invention will become more apparent from a consideration of the following detailed description thereof.

DETAILED DESCRIPTION OF THE INVENTION

The silicone polymer according to the present invention is a polydimethylsiloxane and can be a high molecular weight silicon polymer having a molecular weight in the range of 200 to 200,000. Suitable silicon polymers include those materials having a viscosity in the range of 20 to 2,000,000 centistokes, preferably 100 to 50,000 centistokes, more preferably 350 to 30,000 centistokes, measured by twenty-five degrees Centigrade. Typically, the silicon polymer is endblocked either with trimethylsilyl or hydroxy groups but other endblocking groups are also appropriate. Such silicone polymers are well known in the art and can be prepared by various techniques such as the hydrolysis of dimethyldihalosilanes and subsequent condensation of the resulting hydrolysis product, or by the cracking and subsequent polymerization of dimethylcyclosiloxanes.

These silicone polymers can be represented by the formula:

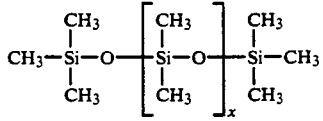

in which x is an integer having a value of from one to one hundred thousand. Preferably, x has a value of about six hundred and the nominal viscosity of the silicone polymer is about five thousand centistokes measured at twenty-five degrees Centigrade.

The silicone polymers of the present invention and methods for their preparation are described in U.S. Pat. No. 3,402,192, issued Sep. 17, 1968, which is incorporated herein by reference. Such materials are copolymers having the average structural formulae:

  (1)

  (2)

  (3)

and

in which formulae $R_a$ is a hydrocarbon radical free of aliphatic unsaturation and contains from 1 to 10 carbon atoms, Me is a methyl radical, G is a radical of the structure $-D(OR'')_m A$ wherein D is an alkylene radical containing from 1 to 30 carbon atoms, R'' is composed of ethylene radicals and radicals selected from the group consisting of propylene and butylene radicals, the amount of ethylene radicals relative to the other alkylene radicals being such that the ratio of carbon atoms to oxygen atoms in the total OR'' blocks ranges from 2.3:1 to 2.8:1, m has an average value from 7 to 100, A is a radical selected from the group consisting of the $-OR'$, $-OOCR'$ and

radicals wherein R' is a radical free of aliphatic unsaturation selected from the group consisting of hydrocarbon and hydrocarbonoxy radicals, the A radical containing a total of less than eleven atoms, a has an average value of from 0 to 1, n has an average value of from 6 to 420, d has an average value of from 0 to 30, b has an average value of from 1 to 30 and c has an average value of from 3 to 30.

said copolymers containing at least 13 percent by weight $OSiMe_2$ units based on the weight of the copolymer.

The water dispersible silicone of the present invention constitutes 25 to 75 percent by weight of the silicone polymer described above and 75 to 25 percent by weight of the silicone copolymer described above.

Some particularly preferred embodiments of the water dispersible silicone contain 25 percent by weight of the silicone polymer and 75 percent by weight of the silicone copolymer, 50 percent by weight of the silicone polymer and 50 percent by weight of the silicone polymer, and 75 percent by weight of the silicon polymer and 25 percent by weight of the silicon copolymer.

These compositions may be prepared by simply mixing together the two ingredients in the appropriate proportions until a homogeneous mixture is obtained. It has been found that two ingredients form a homogeneous white creamy mixture, and that the mixture is stable and highly water dispersible. Water solutions of the mixture are creamy white and exhibit a blue haze. The water solutions of the mixture are also shelf stable. The mixture may be formed into water solutions containing up to about sixty-five percent by weight of water. The mixture may be added to various aqueous systems such as emulsions, microemulsions, solutions, dispersions, and suspensions.

The following examples are set forth for the purpose of illustrating the concepts of the present invention in more detail.

EXAMPLE

Several blends of a silicone polymer and a silicone copolymer were prepared by adding specific proportions of each ingredient into as container and mixing the ingredients until uniform and homogeneous. The various blends which were prepared are shown below in the table which indicates the weight percent of each of the silicon polymer and the silicone polymer, and the viscosity of the silicone polymer in each instance. The silicone polymer used in the example had the formula:

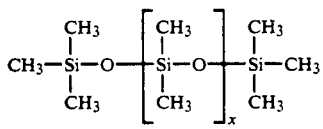

in which x was selected in each instance to provide silicone polymers having viscosities of 350; 5,000; 12,500; and 30,000 centistokes respectively. The silicone copolymer used in the example for the preparation of each blend had formula (3) noted above and a nominal viscosity of fifteen hundred centistokes.

TABLE

| Blend | Silicone Polymer (Weight Percent) | Silicone Copolymer (Weight Percent) | Silicone Polymer (Viscosity cs) |
|---|---|---|---|
| I | 50 | 50 | 350 |
| II | 25 | 75 | 5,000 |
| III | 50 | 50 | 5,000 |
| IV | 75 | 25 | 5,000 |
| V | 25 | 75 | 12,500 |
| VI | 50 | 50 | 12,500 |
| VII | 75 | 25 | 12,500 |
| VIII | 50 | 50 | 30,000 |

All of the Blends I–VIII formed stable homogeneous mixtures. For example, Blend I formed a milky gelatinous mixture. Blends II and III formed thick milky solutions. Blend IV was a thick solution resembling a thick phase emulsion. Blends V–VII were creamy white fluids, while Blend VIII was a smooth clear thick mixture. Water solutions containing varying amounts of Blends I–VIII and up to about sixty-five percent by weight of water were prepared and found to be shelf stable bluish white emulsion-like solutions.

It will be apparent from the foregoing that many other variations and modifications may be made in the compounds, compositions, structures, and methods described herein without departing substantially from the essential features and concepts of the present invention. Accordingly, it should be clearly understood that the forms of the invention described herein are exemplary only and are not intended as limitations on the scope of the present invention as defined in the appended claims.

That which is claimed is:

1. A water dispersible silicone composition consisting of a mixture of 25 to 75 percent by weight of a polydimethylsiloxane polymer having the formula:

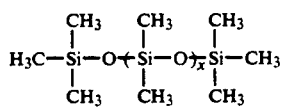

where x is an integer having a value of from one to about one hundred thousand, and 75 to 25 percent by weight of a polyoxyalkylene siloxane copolymer having a formula selected from the group consisting of the formulae:

 (1)

 (2)

 (3)

 (4)

 (5)

 (6)

in which formulae R is a hydrocarbon radical free of aliphatic unsaturation and contains from 1 to 10 carbon atoms.

Me is a methyl radical,

G is a radical of the structure —D(OR")$_m$A wherein D is an alkylene radical containing from 1 to 30 carbon atoms, R" is composed of ethylene radicals and radicals selected from the group consisting of propylene and butylene radicals, the amount of ethylene radicals relative to the other alkylene radicals being such that the ratio of carbon atoms to oxygen atoms in the total OR" block ranges from 2.3:1 to 2.8:1, m has an average value from 7 to 100, A is a radical selected from the group consisting of the —OR', —OOCR' and

radicals wherein R' is a radical free of aliphatic unsaturation selected from the group consisting of hydrocarbon and hydrocarbonoxy radicals, the A radical containing a total of less than eleven atoms, n has an average value of from 6 to 420, d has an average value of from 1 to 30, b has an average value of from 1 to 30 and c has an average value of from 3 to 30, said copolymers containing at least 13 percent by weight OSiMe$_2$ units based on the weight of the copolymer.

2. A composition according to claim 1 in which the silicone polymer has a viscosity in the range of 350 to 30,000 centistokes at 25° C.

3. A composition according to claim 1 in which the silicone copolymer has a viscosity of fifteen hundred centistokes at 25° C.

* * * * *